United States Patent
Lane

(10) Patent No.: US 6,438,602 B1
(45) Date of Patent: Aug. 20, 2002

(54) METHOD OF ESTABLISHING CONNECTIONS BETWEEN CLIENT AND SERVER PROGRAMS IN RESPECTIVE COMPUTERS USING AUTOMATICALLY CONSTRUCTED PIPE NAMES

(75) Inventor: Andrew Stephen Lane, Mission Viejo, CA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/170,547

(22) Filed: Oct. 13, 1998

(51) Int. Cl.$^7$ ............................................... G06F 15/16
(52) U.S. Cl. ..................................................... 709/230
(58) Field of Search ................................. 709/310–400, 709/100, 203, 223, 227

(56) References Cited

U.S. PATENT DOCUMENTS

| | | | | |
|---|---|---|---|---|
| 5,572,674 A | * | 11/1996 | Ernst | 709/221 |
| 5,758,126 A | * | 5/1998 | Daniels et al. | 345/333 |
| 5,867,660 A | * | 2/1999 | Schmidt et al. | 709/227 |
| 5,974,441 A | * | 10/1999 | Rogers et al. | 709/200 |
| 6,003,136 A | * | 12/1999 | Schanze | 713/201 |
| 6,009,175 A | * | 12/1999 | Schanze | 380/23 |
| 6,192,414 B1 | * | 2/2001 | Horn | 709/239 |
| 6,195,366 B1 | * | 2/2001 | Kayashima et al. | 370/475 |

OTHER PUBLICATIONS

Stephen A. Rago "Unix System V Network Programming" 1993, pp. 131–147.*
W.Richard Stevens "Advanced Programming in the UNIX Environment" 1993, pp. 427–448.*

* cited by examiner

*Primary Examiner*—St. John Courtenay, III
*Assistant Examiner*—Van H. Nguyen
(74) *Attorney, Agent, or Firm*—Charles J. Fassbender; Mark T. Starr; Lise A. Rode

(57) ABSTRACT

A method of selectively establishing any one connection of several different types, between a client program in a first computer and a server program in a second computer, includes the following steps. Initially, a control program is provided in the first computer which receives a command with parameters, from the client program, that specify the one type of connection which is to be established. In response, the control program automatically constructs a particular pipename which includes the parameters in a format that differs for each different type of connection. Thereafter, the control program tranmits the pipename which it constructed to a communications program in the second computer. Subsequently, the control program receives a result from the communications program which indicates whether or not the communications program used the pipename to successfully establish the one type of connection to the server program. Then, the control program notifies the client program of the result.

11 Claims, 10 Drawing Sheets

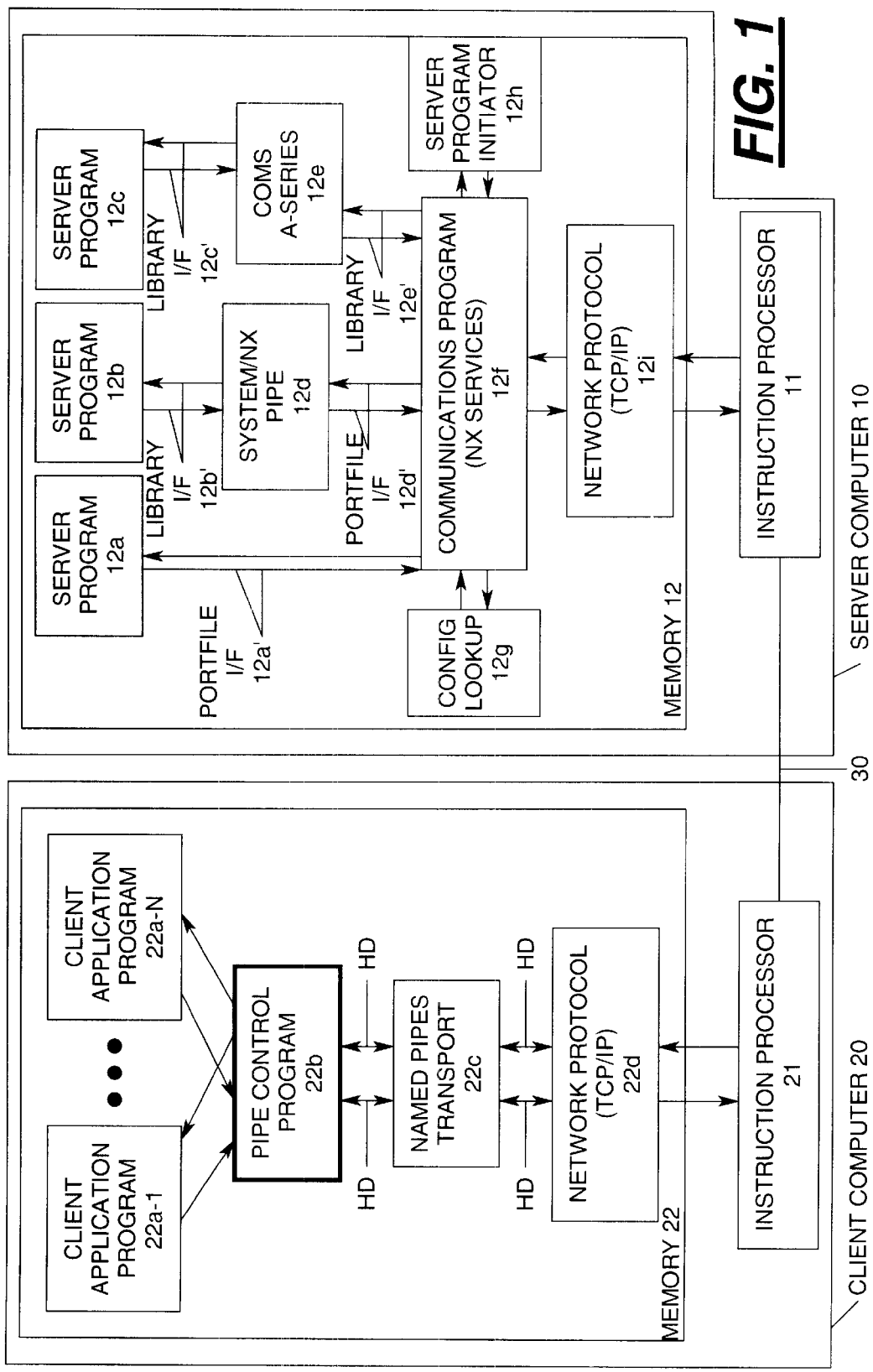

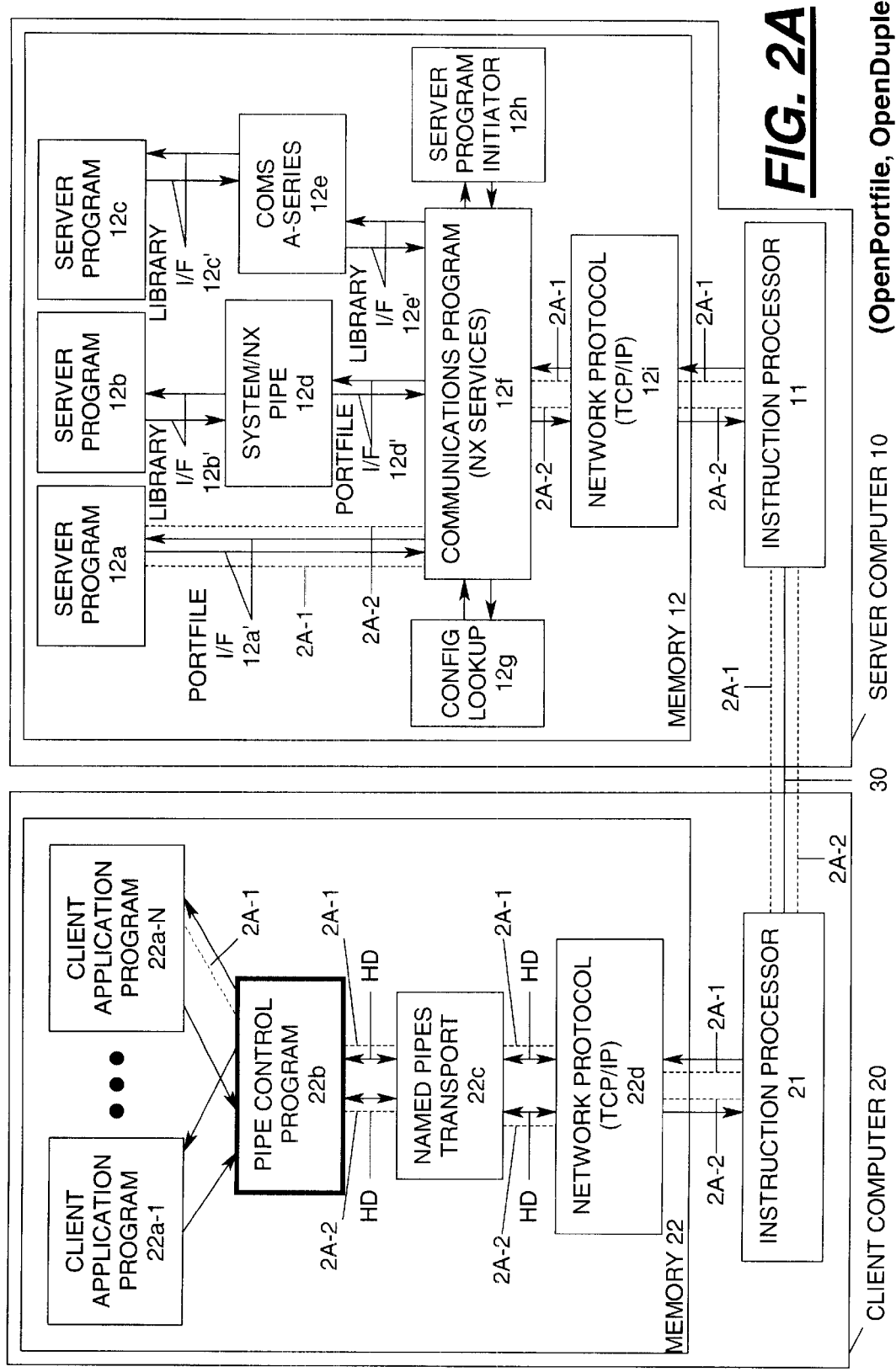

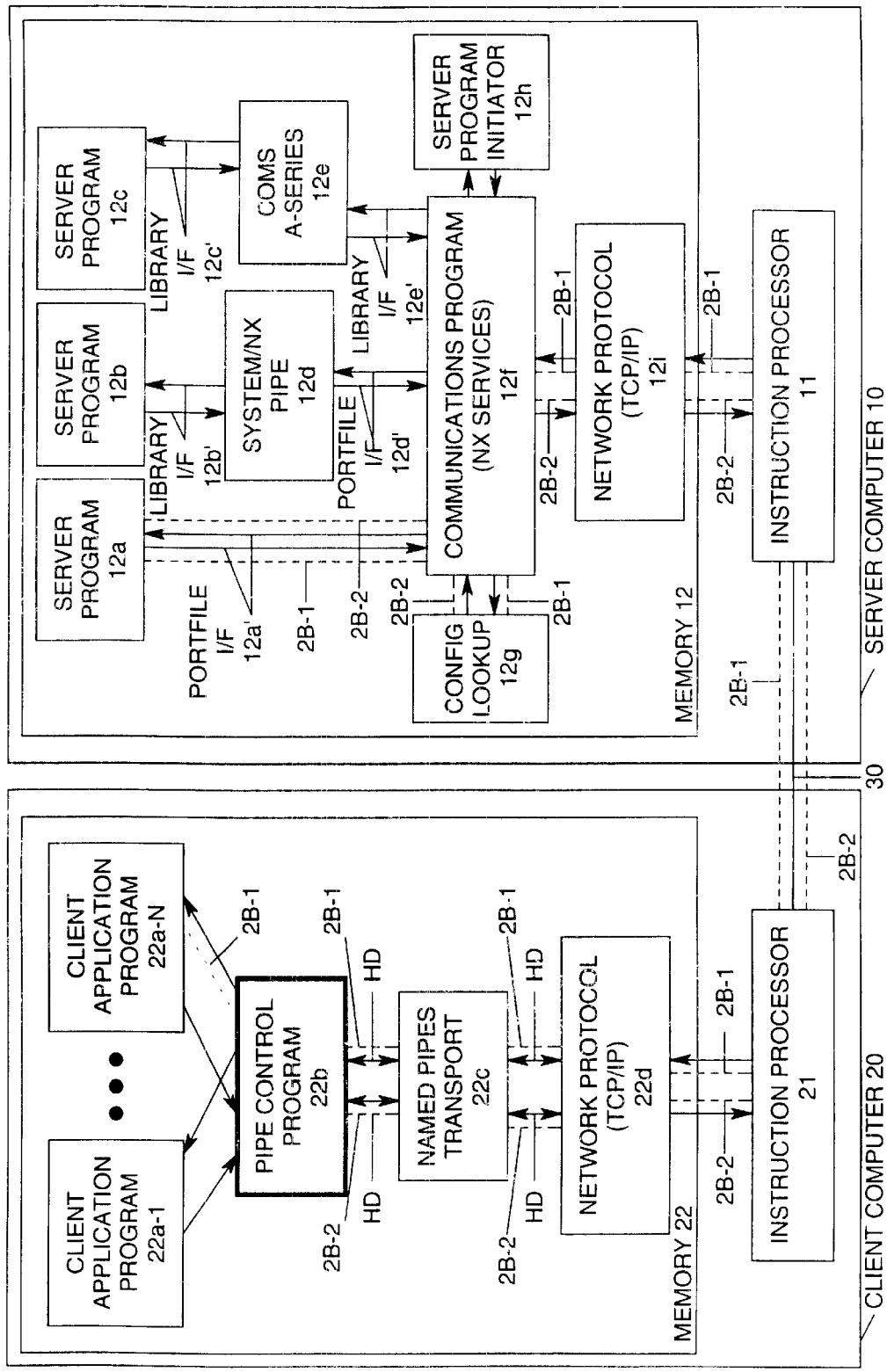
FIG. 2B (OpenConfig, OpenDuplex)

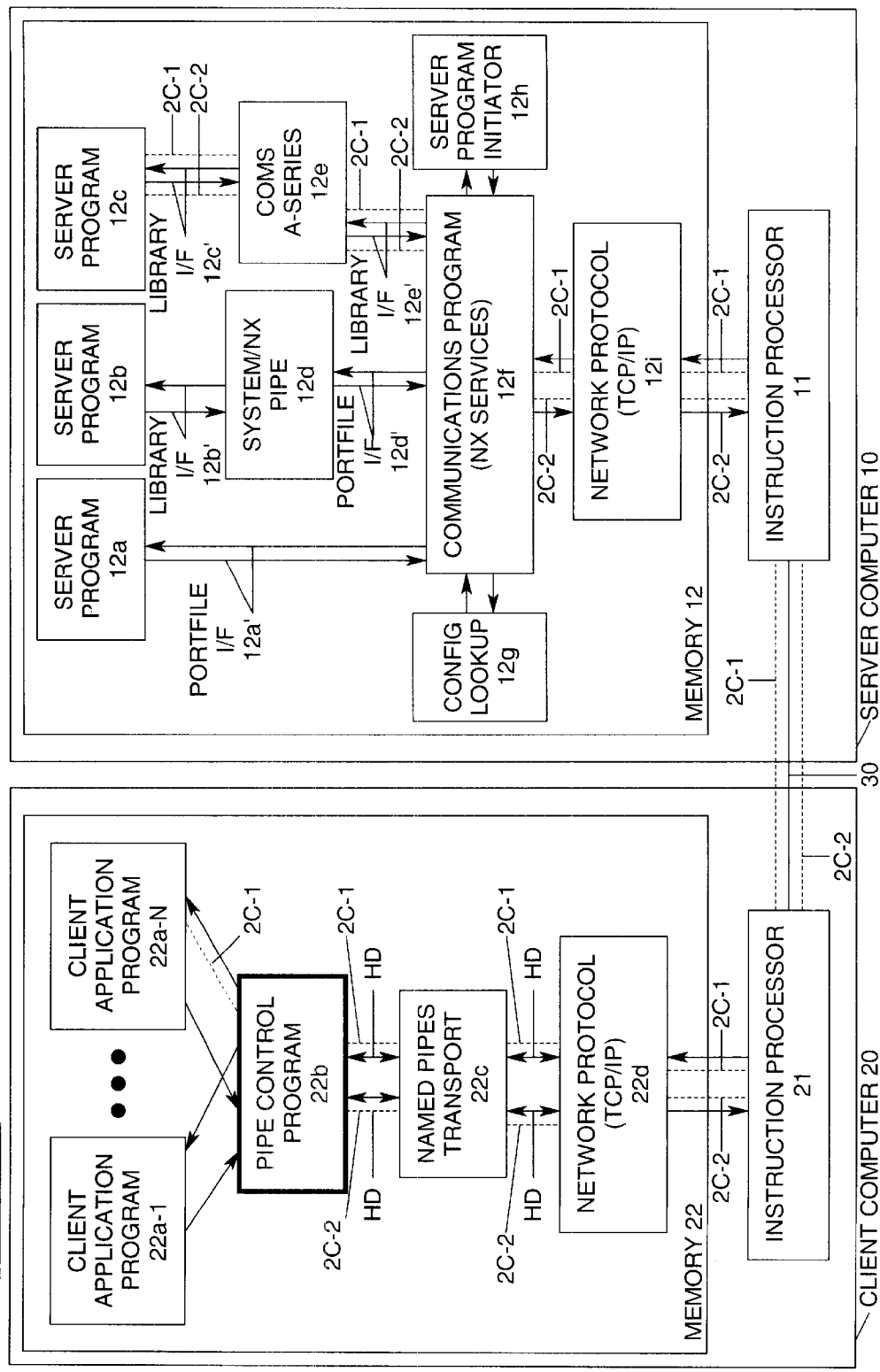
FIG. 2C (OpenCOMSWindow, OpenDuplex)

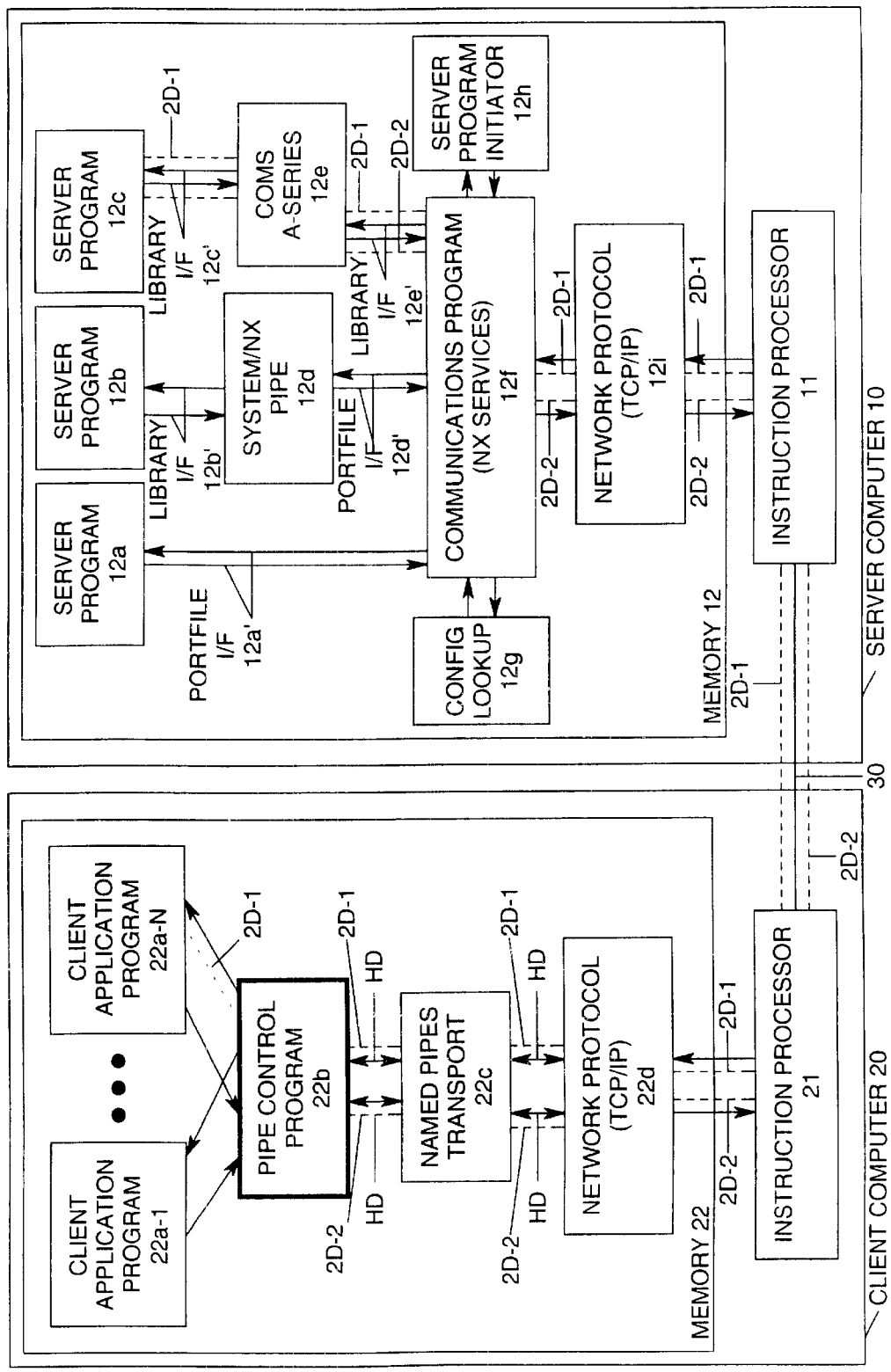
FIG. 2D (OpenCOMSConnection)

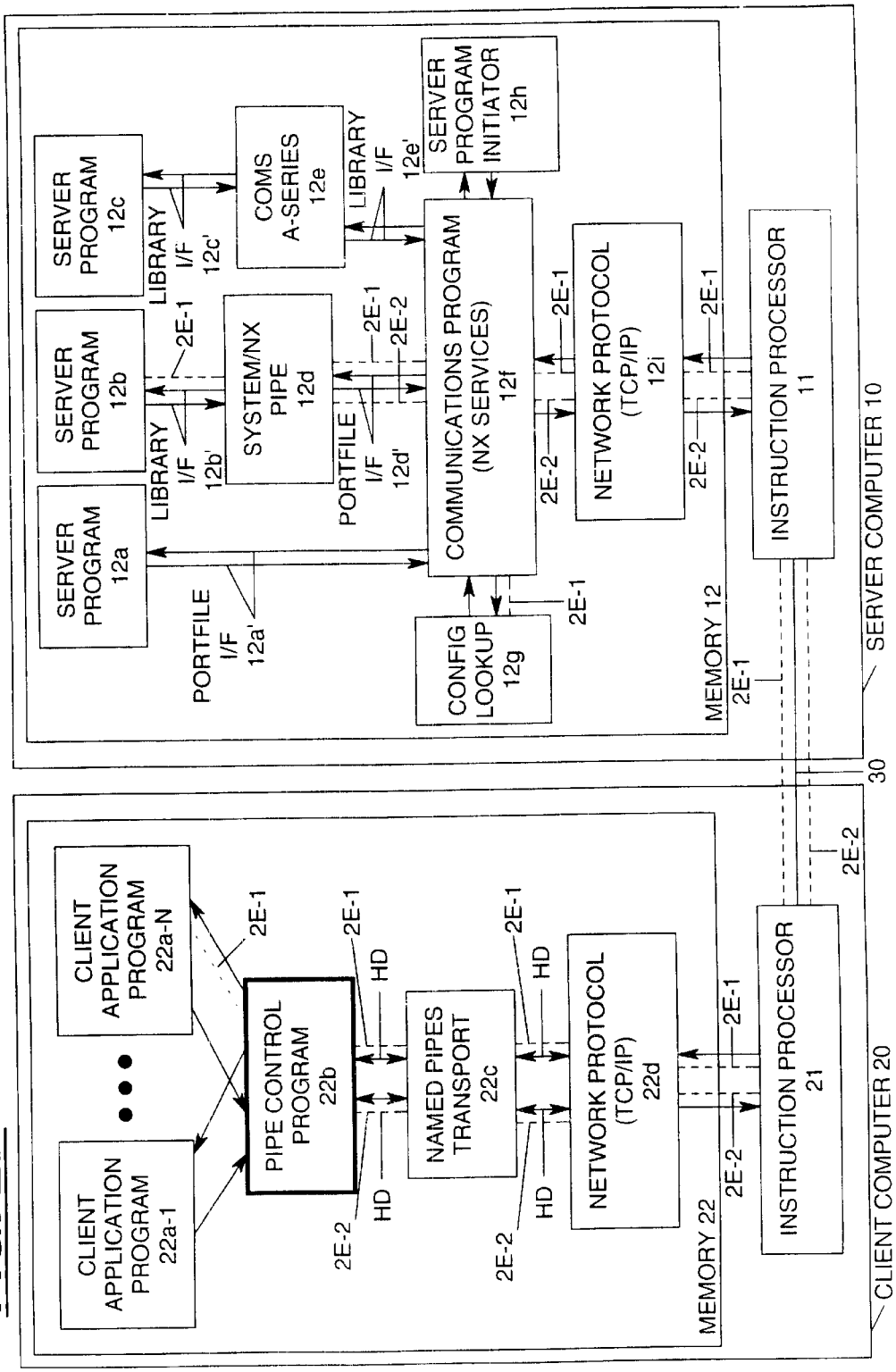
FIG. 2E (OpenLibrary)

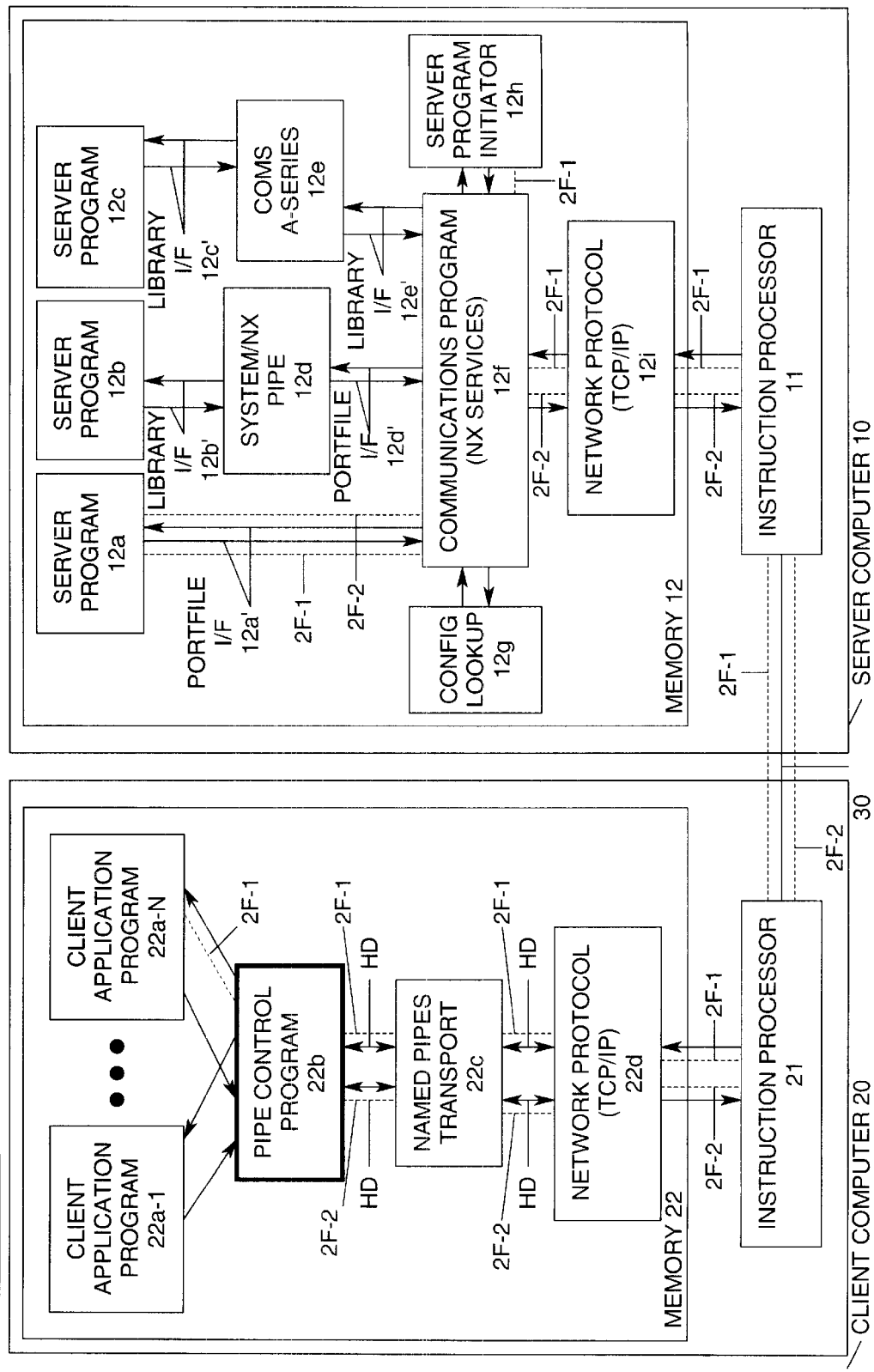
FIG. 2F (OpenProgram, OpenDuplex)

METHOD OF ESTABLISHING CONNECTIONS BETWEEN CLIENT AND SERVER PROGRAMS IN RESPECTIVE COMPUTERS USING AUTOMATICALLY CONSTRUCTED PIPE NAMES

BACKGROUND OF THE INVENTION

This invention relates to client application programs and server programs that run in two different computers, herein called the client computer and the server computer respectively. More particularly, this invention relates to methods of establishing connections between such client and server programs using automatically constructed pipe names.

By a server program is herein meant any computer program which provides various services to other computer programs, that are called client application programs. But, before a client application program can obtain the services of any one server program, a particular type of connection must be established between the client program and the server program through an interface which the server program provides.

In the prior art, many different types of connections and interfaces to the server programs exist. For example, a first type of connection starts from the client program in the client computer, extends over a communication channel to a communications program in the server, and then goes directly to a portfile interface of the server program in the server computer.

As another example, a second type of connection starts from the client program in the client computer, extends over the communication channel to the communications program in the server computer, and goes from there to a portfile interface on another program which in turn connects to a library interface on the server program.

As still another example, a third type of connection starts from the client program in the client computer, extends over the communication channel to the communications program in the server computer, and goes from there to a library interface on another program which in turn connects to a different library interface in the server program.

To actually establish a particular type of connection between the client application program and the server program, a sequence of several steps needs to be performed in the client computer which involves many details that differ depending upon the type of connection that is to be made. For example, to establish each connection of the above first, second, and third type, a pipename needs to be constructed as a complex sequence of several parameters in a particular format that varies with the connection type.

In the prior art, each client program had the burden of including all of the steps that were needed to establish the connections which the client program sought with the server programs. However, to properly generate all of those steps is a very tedious task for the writer of the client program, which requires intimate knowledge of all of the interfaces to the server programs. Consequently, the task is both time-consuming and prone to error.

Accordingly, a primary object of the present invention is to provide a novel control program in the client computer which operates in conjunction with all of the client programs and relieves them of the burden of establishing the various types of connections that they seek with the server programs.

BRIEF SUMMARY OF THE INVENTION

In accordance with the present invention, a method of selectively establishing any one connection of several different types between a client program in a first computer and a server program in a second computer includes the following steps. Initially, a control program is provided in the first computer which receives a command with parameters, from the client program, that specify the one type of connection which is to be established. In response, the control program automatically constructs a particular pipename which includes the parameters in a format that differs for each different type of connection. Thereafter, the control program tranmits the pipename which it constructed to a communications program in the second computer. Subsequently, the control program receives a result from the communications program which indicates whether or not the communications program used the pipename to successfully establish the one type of connection to the server program. Then, the control program notifies the client program of the result.

Due to the operation of the control program, each writer of the client programs is relieved of the tedious task of programming all of the steps which construct the complex pipenames. Instead, to establish a particular type of connection to a server program, the client program needs only to call the control program and sent it a command with parameters that specify the type of connection which is to be established.

In one particular embodiment, the second computer is an A-Series computer, and the communications program is an NX Services program. Also, in one particular embodiment, the control program is executed on the first computer under a windows operating system which includes a CreateFile Application Program Interface; and the control program passes the pipename to the CreateFile Application Program Interface as a substep of the transmitting step.

BRIEF DESCRIPTION OF THE DRAWINGS

FIG. 1 shows a preferred embodiment of a data processing system which incorporates a novel pipe control program whereby various types of connections are established, between client programs and server programs, in accordance with the present invention.

FIG. 2A shows a connection 2A-1 of a first type which is established by the pipe control program in response to an Openportfile command, and it shows a parallel connection 2A-2 which is established by the pipe control program in response to an OpenDuplex Command that follows the OpenPortfile command.

FIG. 2B shows a connection 2B-1 of a second type which is established by the pipe control program in response to an OpenConfig command, and it shows a parallel connection 2B-2 which is established by the pipe control program in response to an OpenDuplex Command that follows the OpenConfig command.

FIG. 2C shows a connection 2C-1 of a third type which is established by the pipe control program in response to an OpenCOMSWindow command, and it shows a parallel connection 2C-2 which is established by the pipe control program in response to an OpenDuplex Command that follows the OpenCOMSWindow command.

FIG. 2D shows two connections 2D-1 and 2D-2 of the third type which operate in parallel and are established by the pipe control program in response to an OpenCONSConnection command.

FIG. 2E shows two connections 2E-1 and 2E-2 of a fourth type which operate in parallel and are established by the pipe control program in response to an OpenLibrary command.

FIG. 2F shows a connection 2F-1 of a fifth type which is established by the pipe control program in response to an OpenProgram command, and it shows a parallel connection 2F-2 which is established by the pipe control program in response to an OpenDuplex Command that follows the OpenProgram command.

DETAILED DESCRIPTION

Figure 3:
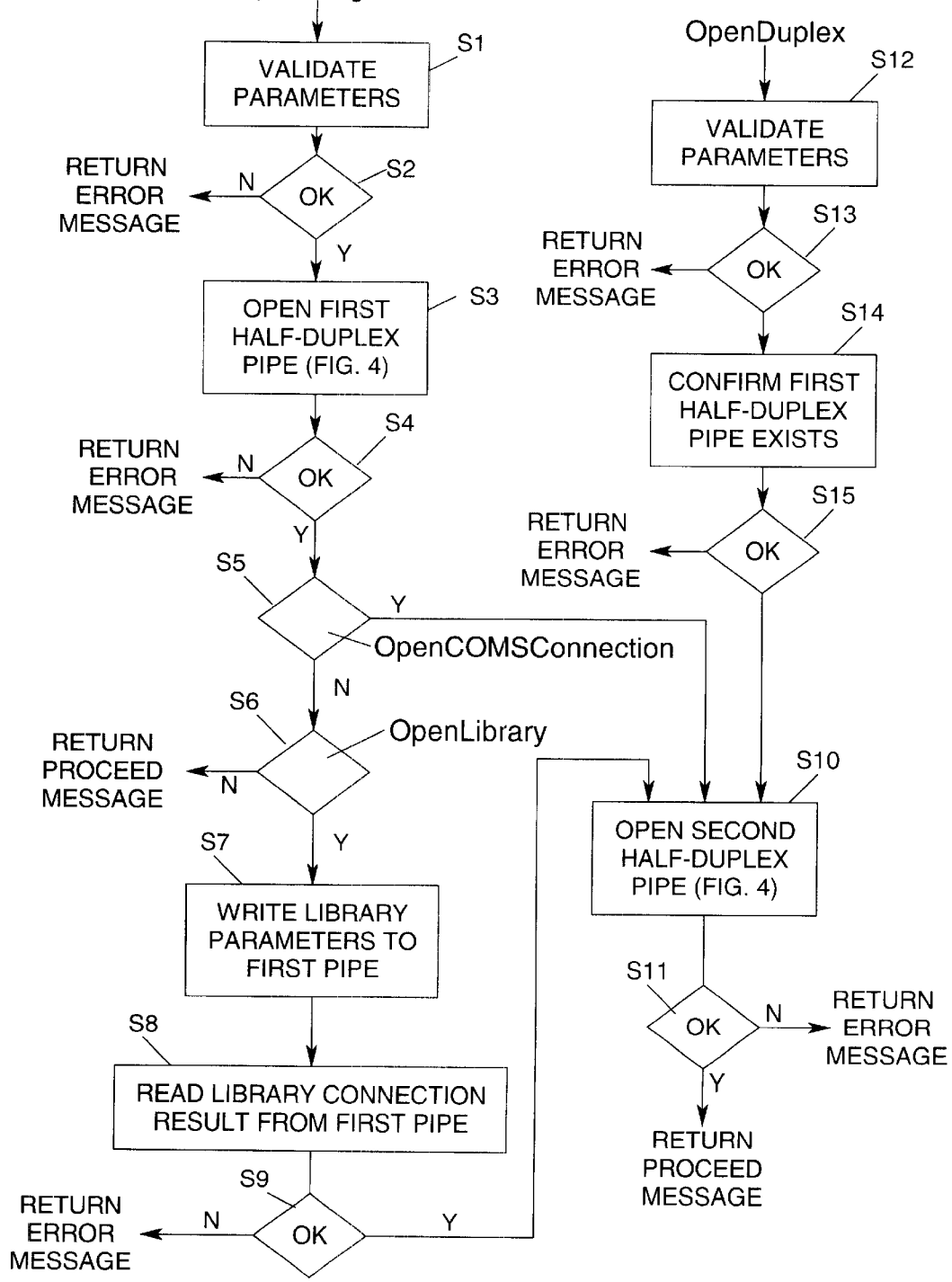
FIG. 3 shows a sequence of steps that are performed by the pipe control program to establish the connections that are shown in FIGS. 2A–2F.

With reference now to FIG. 1, a preferred embodiment of a data processing system which incorporates the present invention will be described. This FIG. 1 data processing system is comprised of a server computer 10 and a client computer 20 that communicate with each other over a communication channel 30.

Included within the server computer 10 is an A-Series instruction processor 11 and a digital memory 12; and, stored within the memory 12 are several A-Series computer programs 12a–12i. All of these items 11, 12 and 12a–12i exist in the prior art from Unisys Corporation. Each program 12a–12i is executed by the instruction processor 12 and performs the following functions.

Program 12a is a server program which provides a particular service to the external client computer 20. This server program 12a is accessed through a portfile interface 12a'.

Program 12b is a second server program which provides another service to the external client computer 20. But, the server program 12b is accessed through a library interface 12b' which is coupled to a system/NX pipe program 12d that has its own portfile interface 12d'. In operation, the system/NX pipe program 12d implements a library interface on the behalf of the client computer 20 by converting a portfile input on the interface 12d' to a library call on the interface 12b', and converting a library call on the interface 12b' to a portfile output on the interface 12d'.

Program 12c is a third server program which provides still another service to the external computer 20. But, the server program 12c is accessed through a library interface 12c' which is coupled to a CONS A-Series program 12e that has its own library interface 12e'. This CONS A-Series program 12e handles terminal connections and application program management, and it processes transactions via transaction-based routing.

Program 12f is an A-Series communications program called NX Services which uses the Microsoft SMB protocol (Server Message Block protocol) to access services from the server programs 12a, 12b, and 12c. A specification of the SMB protocol is provided in the document called "Microsoft Networks SMB File Sharing Protocol Extensions" version 3.4, published Dec. 1, 1993 by Microsoft.

Two other programs 12g and 12h operate in conjunction with the communications program 12f. Program 12g provides a configuration look-up function which receives an identifier as an input, and returns various attributes associated with the identifier as an output. Program 12h is a server program initiator which receives a code file name as an input, and initiates a server program as a result.

Program 12i implements an open systems protocol for sending and receiving information packets over the communication channel 30. Suitably, this protocol is TCP/IP.

Included within the client computer 20 is an Intel instruction processor 21 (such as the x486), and a digital memory 22 which stores several computer programs 22a -1 thru 22a -N, 22b, 22c, and 22d. All of these programs are executed by the instruction processor 21, and they perform the following functions.

Programs 22a -1 thru 22a -N are separate client application programs which performs respective tasks that require services from one or more of the server programs 12a, 12b and 12c. But before the services of any one server program can be obtained, a particular type of connection needs to be established between the client application program and the server program.

Now, in accordance with the present invention, each client application program 22a -1 thru 22a -N requests that various types of connections be established with the server programs 12a –12c by calling a novel Pipe Control Program 22b and selectively sending that program 22b one or more high level commands, with accompanying parameters, for execution. One preferred set of these high level commands is listed below in TABLE 1.

TABLE 1

| Command |
| --- |
| OpenPortFile (parameters) |
| OpenConfig (parameters) |
| OpenCOMSWindow (parameters) |
| OpenDuplex (parameters) |
| OpenCOMSConnection (parameters) |
| OpenProgram (parameters) |
| OpenLibrary (parameters) |

Each time any one of the commands in TABLE 1 is received by the Pipe Control Program 22b, that program examines the command's parameters, which vary from command to command. Then, if the parameters are complete and valid, the Pipe Control Program 22b attempts to form a particular type of connection to the server computer which the command and its parameters specify.

To make the above connections, the pipe control program 22b interacts with two other programs 22c and 22d in the client computer 20. Program 22c is a Named Pipes Transport program which handles the opening, closing, and managing of named pipes between the client computer 20 and the server computer 10; and program 22c implements an open system protocol for sending and receiving information packets over the named pipes which matches the protocol of program 12i in the server computer 10.

For each command in TABLE 1, the details of the accompanying parameters and the connections which are formed by the Pipe Control Program 22b are as follows.

Command=OpenPortFile (Hostname,
  Portname,
  Pipe_Size,
  Private_Usercode,
  Connection_Dialog)
  Hostname is a parameter which specifies the name of
    the server computer to which a connection is to be
    made.
  Portname is a parameter which specifies the name of a
    portfile on the server computer which needs to be
    matched for a connection.

Pipe_Size is a parameter which specifies the size in bytes, of the largest message that can be received or sent over the connection.

Private_Usercode is a parameter which is set to a security code if such a code is required by the portfile.

Connection_Dialog is a True/False parameter and True indicates that a dialog is permitted with an operator of the client computer to obtain session establishment information.

In response to the OpenPortFile command, the Pipe Control Program 22b establishes a particular type of connection which is illustrated by the dashed lines 2A-1 in FIG. 2A. This is a half-duplex connection directly to an already executing server program which offers a portfile connection.

Command=OpenConfig(Hostname,
    ConfigName,
    Pipe_size,
    Connection_Dialog)
        Hostname, Pipe_Size, and Connection_Dialog are parameters which were previously defined.
        Config name is a parameter which specifies a unique identifier for a set of preexisting attributes on the server computer.

In response to the OpenConfig command, the Pipe Control Program 22b establishes a particular type of connection which is illustrated by the dashed lines 2B-1 in FIG. 2B. This is a half-duplex connection through the NX Services program 12f to a portfile provided by an already executing server program or to a server program which will start executing as a result of this operation. The particular server program is identified by the NX services program 12f by supplying the Configname parameter to the Config Lookup program 12g. In turn, that program 12g returns attributes which are sufficient to uniquely identify the particular server program to which a connection is to be made.

Command=OpenCOMSWindow (Hostname,
    CCFService,
    WindowName,
    StationName,
    Pipe_Size,
    Connection_Dialog)
        Hostname, Pipe_Size and Connection_Dialog are parameters which were previously defined.
        CCFService is a parameter which specifies a previously configured identifier to the COMS Custom Control Facility (COMS CCF).
        WindowName is a parameter which specifies the name of a window inside of the COMS A-Series program 12e to which the named pipe is connected. If the value of the window name is non-null, the named pipe is connected to only that window within COMS.
        StationName is a parameter which specifies the name of a station in COMS in which the connection for the named pipe to the above-mentioned window is provided. If both station name and window name are non-null, then the station name is assigned to the specific station opened for a COMS connection to the named pipe.

In response to the OpenCOMSWindow command, the Pipe Control Program 22b establishes a particular type of connection which is illustrated by the dashed lines 2C-1 in FIG. 2C. This is a half-duplex connection through the COMS A-Series program 12e on the server. To make this connection, the NX Services program 12f opens a library interface to the COMS A-Series program 12f for this half-duplex connection, and COMS implements its own library interface to the server program.

Command=OpenCOMSConnection (Hostname,
    CCFService,
    WindowName,
    StationName,
    Pipe_Size,
    Connection_Dialog,
    Last_Error)
        Hostname, CCFService, WindowName, StationName, Pipe Size, and Connection_Dialog are parameters which were previously defined.
        Last_Error is a parameter which specifies a pointer to a location in memory where the last error from the execution of the command is stored.

In response to the OpenCOMSConnection command, the Pipe Control Program 22b establishes a particular type of connection which is illustrated by the dashed lines 2D-1 and 2D-2 in FIG. 2D. This is a full-duplex connection through the COMS A-Series program 12e on the server. To make this connection, the NX Services program 12f opens a library interface to the CONS A-Series program 12f, and CONS implements its own library interface to the server program. By comparison, OpenCONSWindow establishes a similar connection, but it is half-duplex.

Command=OpenLibrary (Hostname,
    SL,
    Library_Name,
    EntryPoint,
    Interface_Type,
    Pipe_Size,
    Connection_Dialog)
        Hostname, Pipe_Size and Connection_Dialog are parameters which were previously defined.
        SL is a parameter which is True or False. If SL is true, the Library_Name is a function name. If SL is False, the Library_Name is a title.
        Library_Name is a parameter which specifies the function name or the title of the library that is called by this command.
        EntryPoint is a parameter which specifies the name of the point of entry in the library to be used for receiving messages as a result of establishing this connection.
        Interface_Type is a parameter which specifies the type of library to be connected through this connection. The library chosen can be either an A-Series connection library or an A-Series server library.

In response to the OpenLibrary command, the Pipe Control Program 22b establishes a particular type of connection which is illustrated by the dashed lines 2E-1 and 2E-2 in FIG. 2E. This is a full-duplex connection to a specified library in the server. The library can be in the form of an interface to a server program. In executing this command, the NX Services program 12f establishes a portfile interface to the System/NX Pipe program 12d which implements a library interface to a server program.

Command=OpenProgram (Hostname,
    Intname,
    Pipe_Size
    Usercode,
    Program,
    Family,
    Taskvalue, Option,
Connection_Dialog Hostname, Pipe_Size and Connection_Dialog are parameters which were previously defined.

Intname is a parameter which specifies the INTNAME attribute of the portfile declared in the server program. The INTNAME attribute is equated to a file by the NX Services program 12f when the server program is initiated.

Usercode is a parameter which specifies the usercode portion of the server codefile executed by the server program initiator 12h.

Program is a parameter which specifies the filename portion of the server codefile executed by the server program initiator 12h.

Family is a parameter which specifies the family name portion of the server codefile executed by the server program initiator 12h.

Taskvalue is a parameter which specifies the value that will be assigned to the TASKVALUE task attribute for the task initiated as a result of executing this command.

Option is a parameter which specifies one or more options to the server program. If its value is null then no options are passed.

In response to the OpenProgram command, the Pipe Control Program 22b establishes a particular type of connection which is illustrated by the dashed lines 2F-1 in FIG. 2F. This is a half-duplex connection to a server program which is initiated on the server computer by a server program initiator 12h. To make this connection, the NX Services program 12f passes a codefile name as input to the server program initiator 12h. Then the server program initiator 12h executes the codefile to initiate a server program through the NX Services program 12f which opens a portfile connection directly to the server program.

Command=OpenDuplex (Name,

Input)

Name is a parameter which matches the portfile/library interface that is used for a full-duplex connection to be opened, to the interface of the half-duplex connection that is already open.

Input is a parameter which is True/False. If true, the parameter specifies that the second pipe being opened is to be used for input from the caller's perspective. If false, the parameter specifies that the second pipe is used for output from the caller's perspective.

In response to the OpenDuplex command, the Pipe Control Program 22b establishes a second half-duplex connection which is illustrated by the dashed lines 2A-2 in FIG. 2A, 2B-2 in FIG. 2B, 2C-2 in FIG. 2C, and 2F-2 in FIG. 2F. This completes a full duplex connection which is established by the above second half-duplex connection and the half-duplex connection that already exists as a result of executing any one of the commands OpenPortFile, OpenConfig, OpenCOMSWindow, and OpenProgram.

Next, with reference to FIG. 3, a series of steps will be described which begin with step S1 and which are performed by the Pipe Control Program 22b to execute the following commands: OpenPortFile, Openconfig, OpenCOMSWindows, OpenCONSConnection, OpenLibrary, and OpenProgram. Step S1 checks the parameters that are received from a client application program for any one of the above commands. Then, an error message is sent by step S2 back to the client application program if the received parameters are not valid.

Figure 4:
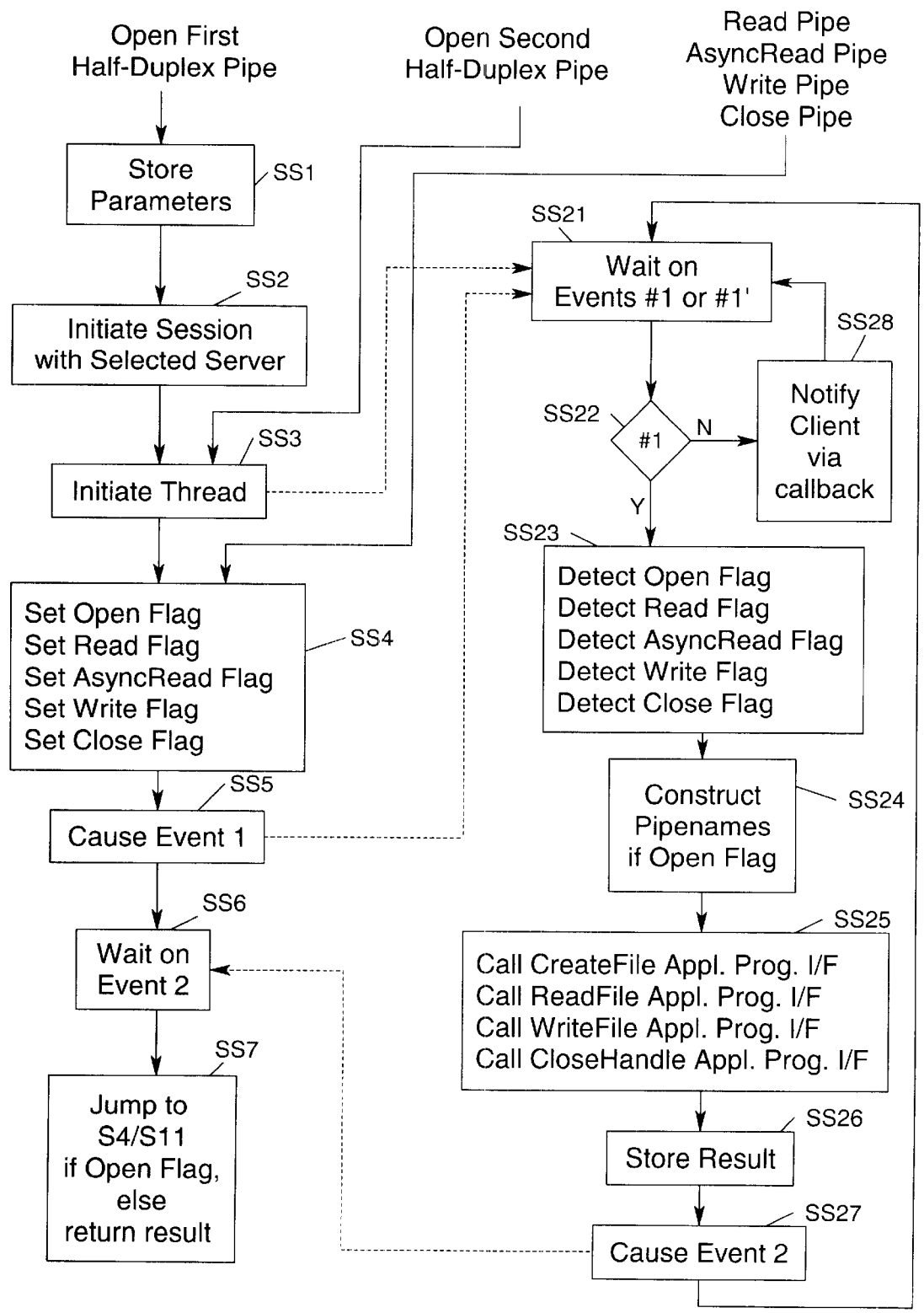
FIG. 4 shows a sequence of substeps that are performed by the pipe control program during a) two of the steps S3 and S10 in FIG. 3 to help establish the connections of FIGS. 2A–2F, and b) during subsequent operations which use and/or close the connections.

If the received parameters are valid, then step S3 is performed. There, the pipe control program 22b attempts to use the parameters to open a first half-duplex pipe to the server computer 10. In the preferred embodiment, step S3 is performed by a sequence of several substeps which is shown in FIG. 4 and which is described below in conjunction with that figure.

When the pipe control program 22b is not successful in its attempt to open the first half-duplex pipe, it sends an error message in step S4 to the client application program. And when the pipe control program 22b is successful in opening the first half-duplex pipe, it proceeds as follows.

If the command being executed is OpenCOMSConnection, then a branch is taken in step S5 to step S10. If the command being executed is OpenLibrary, then a branch is taken in step S6 to step S7. And if the command being executed is OpenPortFile or OpenConfig or OpenLibrary or Openprogram, then a message to proceed is sent in step S6 to the client application program.

In step S7, the pipe control program 22b sends several library parameters which accompany the OpenLibrary command to the first half-duplex pipe that was previously opened in step S3. Those parameters are SL, Library-Name, Entry Point, and Interface_Type. Then the pipe control program 22b waits for a result in step S8 from the server computer 10 over the first half-duplex pipe.

If the received result indicates that the server computer was unable to use the library parameters to successfully establish a connection with a server program, then an error message is sent by step S9 back to the client application program. Otherwise, a branch is taken by step S9 to step S10.

In step S10, the pipe control program 22b attempts to use the parameters that it receives with a command to open a second half-duplex pipe to the server computer 10. Step S10 is performed by many of the same substeps which are shown in FIG. 4 that open the first half-duplex pipe in step S3. If the second half-duplex pipe is successfully opened, then the pipe control program 22b sends a message in step S11 to the client application program indicating that it can proceed; otherwise an error message is sent.

By comparision, to execute the OpenDuplex command, the pipe control program 22b performs another sequence of steps which begins with step S12. There, the pipe control program checks the parameters that accompany the OpenDuplex command. Then, a branch is taken by step S13 to step S14 if the parameters are valid; otherwise an error message is sent to the client application program.

In step S14, the pipe control program 22b checks whether or not a first half-duplex pipe is already open due to a previously executed command of OpenPortfile or OpenConfig or OpenCOMSWindows or OpenProgram. If this first half-duplex pipe is not open, then an error message is sent in step S15 to the client application program. Otherwise a branch is taken to step S10 which then opens a second half-duplex pipe as described above.

One particular feature of the OpenDuplex command is that the first and second half-duplex pipes which are opened operate in parallel with each other. Consequently, a full-duplex connection is provided to the client application programs, while the complexity of establishing multiple pipes and multiple connections of different types is hidden from the client application programs.

Turning now to FIG. 4, a sequence of substeps will be described which is performed by the pipe control program 22b to open the first and second half-duplex pipes in steps S3 and S10 of FIG. 3. This sequence begins with the substep SS1 when the first half-duplex pipe is being opened, and it begins with substep SS3 when the second half-duplex pipe is being opened.

Substep SS1 stores the parameters that accompany each command in TABLE 1 for subsequent use by a separate thread. That separate thread is shown on the right-hand side of FIG. 4, and it performs all of the substeps which are labeled SS21 thru SS28.

Next, is substep SS2, the pipe control program 22b initiates a session with the server computer which the parameters select. In this substep SS2, the following tasks are performed:

If Session already established
   return good result
If Usercode not supplied
   get current network usercode
Logon with Usercode and Password if supplied
If Session established
   return good result
If Connection_Dialog_Allowed
   While Session not established and User didn't Cancel
     Get Usercode and Password from user
     If User didn't Cancel
       Logon with Usercode and Password from user
   If Session established
     return good result
return error result Thereafter, substep SS3 is performed wherein the pipe control program 22b initiates the separate thread SS21–SS28. Initially, substep SS21 waits for any one of two future events, called event #1 and event #1', to occur.

Meanwhile, the pipe control program 22b proceeds with substep SS4 which sets one of four flags. An "open" flag is set whenever a pipe is being opened per step S3 or step S10 in FIG. 3; and one of four different flags (Read Flag, AsyncRead Flag, Write Flag, and Close Flag) are set in other cases which will be described shortly.

Next in substep SS5, the pipe control program 22b causes event #1 to occur which in turn causes the execution of the separate thread SS21–SS28 to proceed. Then, in substep SS6, the pipe control program 22b waits for a future event called event #2.

Next, the separate thread proceeds with substep SS22 that determines which of the two events #1 or #1' occurred. If event #1 occurred, a branch is taken to substep SS23; otherwise a branch is taken to substep SS28.

In substep SS23, the separate thread detects the particular flag that was set in substep SS4. Then, if the open flag is set, substep SS24 retrieves the parameters that were stored in substep SS1 and uses them to construct a pipename which the NX services program 12f recognizes. That pipename directs the NX services program 12f to open the desired connection on the server computer 10. For each command in TABLE 1, the pipename is constructed as shown in FIG. 5.

Figure 5:
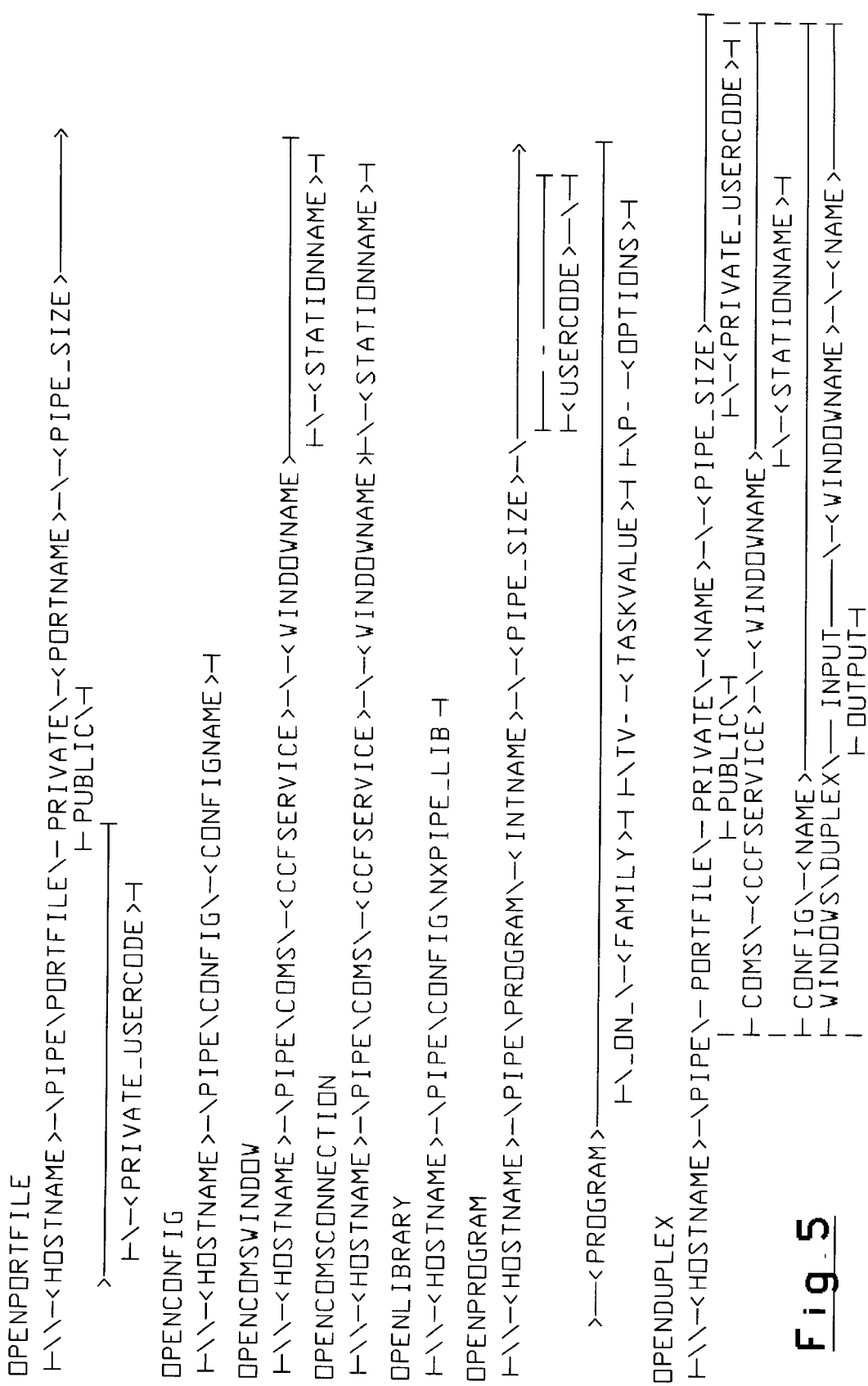
FIG. 5 shows several pipenames that are constructed by one particular substep SS24 in FIG. 4 for use in establishing the connections of FIGS. 2A–2F.

Each pipename in FIG. 5 is comprised of a sequence of several parameters and symbols in a format that proceeds from left to right. Where two or more items are shown in vertical alignment, only one of those items occurs in the pipename; and which one depends on the particular connection that is to be made. For example, the pipename that is constructed for the Openportfile command has the following structure.

|  | 1st → \\ |
|  | 2nd → <Hostname> |
|  | 3rd → \PIPE\PORTFILE\ |
| if a security code) is required), | 4th → PRIVATE\ |
| if no security code) is required), | 4th → PUBLIC\ |
|  | 5th → <Portname> |
|  | 6th → \<Pipe_Size> |
| if a security code) is required) | 7th → \<Private_Usercode> |

Next in substep SS25, one of four different calls is made. If the Open Flag is set, a call is made to a CreateFile Application Program Interface passing the Pipename constructed in substep SS24. If the Read Flag or AsyncRead Flag is set, a call is made to a ReadFile Application Program Interface. If the Write Flag is set, a call is made to a WriteFile Application Program Interface. And if the Close Flag is set, a call is made to a CloseHandle Application Program Interface. All of these interfaces occur within the Named Pipes Transport Program 22c in FIG. 1 and are provided with the windows operating system from Microsoft.

Subsequently, when a return occurs from any one of the above calls, substep SS26 is performed in which a result from the call is stored. Then, substep SS27 causes event #2 to occur and branches back to substep SS21.

Next in substep SS6, the occurrence of event #2 is detected; and in response, substep SS7 is performed. There, a branch is taken back to step S4 in FIG. 3 if the first half-duplex pipe was just opened; and a branch is taken back to step S11 in FIG. 3 if the second half-duplex pipe was just opened. Otherwise, the result that was stored in substep SS26 is returned to the client application program.

After a connection to a server application has been established by execution of the TABLE 1 commands via the steps and substeps of FIGS. 3 and 4, a client application program can include other commands which use the established connections to transfer data. For example, TABLE 2 below shows a suitable set of such commands.

TABLE 2

Command = Write Pipe
Command = Read Pipe
Command = AsyncRead Pipe

By a Write Pipe command, data is sent from a client application program to a pipe in an established connection for transfer to a server program. By a Read Pipe command, data that was sent or is to be sent from a server program to a pipe in an established connection, is received by a client application program. And by an AsyncRead command, a read operation is initiated by a client application on a pipe in an established connection; and the client application is given notice when at some future time, data is actually sent to the client by the server via the pipe. Then upon receipt of that notice, the data is received by the client by executing the Read Pipe command.

To execute the TABLE 2 commands, all of the FIG. 4 substeps SS4 thru SS7, and SS21 thru SS28, are performed beginning with the substep SS4. There, the Write Flag is set if the command being executed is Write Pipe; the Read Flag is set if the command being executed is Read Pipe; and the AsyncRead Flag is set if the command being executed is AsyncRead Pipe.

Next, substep SS5 is performed which causes event #1 to occur. In response, event #1 is detected by the substep SS21 in the separate thread on the right-hand side of FIG. 4; and so that thread proceeds through substeps SS22–SS24 to substep SS25.

When substep SS25 is performed for a Write Pipe command, then the call to the WriteFile Application Program Interface transfers data from the client application to the pipe in the previously established connection. When substep SS25 is performed for a Read Pipe command, then the call to the ReadFile Application Program Interface initiates a Read operation from the pipe in the previously established connection, and waits until data is actually received for the client.

By comparison, when substep SS25 is performed for the AsyncRead Pipe command, then the call to the ReadFile Application Program Interface causes a read operation to be initiated for the client from the pipe in the previously established connection, and then substeps SS26–SS27 are performed immediately. Substep SS27 causes event #2 and branches back to substep SS21. Due to the occurrence of event #2, the wait in substep SS6 ends and execution of the Client Application Program continues.

Meanwhile, substep SS21 waits for event #1 or #1'. Event #1' occurs when data is actually received in the pipe for the read operation that was started in substep SS25. When event #1' is detected, substeps SS22 and SS28 are performed whereby the client is notified via a callback that the data has been received.

To terminate an established connection between the client and server programs, the client program executes a Close Pipe command. That command is also performed by the FIG. 4 substeps of SS4 thru SS7, and SS21 thru SS28. First in substep SS4, the close flag is set; and later in substep SS23, that flag is detected. As a result, the CloseHandle application program interface is called in substep SS25 which breaks the established connection.

One preferred embodiment of the invention has now been described in detail. In addition however, various changes and modifications can be made to the details of the described preferred embodiment without departing from the nature and spirit of the invention. Accordingly, it is to be understood that the invention is not limited to just the details of the illustrated preferred embodiment but is defined by the appended claims.

What is claimed is:

1. A method of selectively accessing server programs in a data processing system which includes a server computer and a client computer that are coupled to each other over a communication channel, where said server computer includes 1) several of said server programs and 2) a network protocol program which communicates externally over said communication channel with said client computer; and where to selectively access a particular server program, said client computer needs to establish an internal connection within said server computer between said network protocol program and said particular server program, with said internal connection being of a different type for each particular server program; said method including the steps of:

providing a control program in said client computer which receives a command with parameters, from a client program in said client computer, that specify one particular type of internal connection which is to be established to a selected server program in said server computer;

responding, in said control program, by automatically constructing a particular pipename which includes said parameters in a format that differs for each different type of internal connection;

transmitting said pipename from said control program to said network protocol program in said server computer;

receiving a result in said control program from said network protocol program which indicates whether or not said server computer used said pipename to successfully establish said one particular type of internal connection from said network protocol program to said selected server program; and, notifying said client program from said control program of said result.

2. A method according to claim 1 wherein said particular pipename is automatically constructed by said control program such that the format and parameters of said pipename direct a communications program in said server computer to establish an internal connection from said communications program directly to a portfile interface in said selected server program.

3. A method according to claim 1 wherein said particular pipename is automatically constructed by said control program such that the format and parameters of said pipename direct a communications program in said server computer to establish an internal connection by supplying at least one parameter in said pipename to a look-up program on said server computer, which then returns attributes that identify said selected server program.

4. A method according to claim 1 wherein said particular pipename is automatically constructed by said control program such that the format and parameters of said pipename direct a communications program in said server computer to establish an internal connection to a library interface in another program in said server computer, which in turn extends that connection to a library interface in said selected server program.

5. A method according to claim 1 wherein said particular pipename is automatically constructed by said control program such that the format and parameters of said pipename direct a communications program in said server computer to establish a connection to a portfile interface in another program in said server computer which in turn extends that connection to a library interface in said selected server program.

6. A method according to claim 1 wherein said particular pipename is automatically constructed by said control program such that the format and parameters of said pipename direct a communications program in said server computer to pass at least one parameter from said pipename to a server program initiator, which then executes a codefile that enables said communications program to establish a connection from said communications program directly to a portfile interface in said selected server program.

7. A method according to claim 1 wherein said server computer includes a communications program which receives said particular pipename from said network protocol program and, in response, establishes said internal connection to said selected server program.

8. A method according to claim 7 wherein said control program is executed on said server computer under a windows operating system which includes a CreateFile Application Program Interface; and said control program passes said pipename to said CreateFile Application Program Interface as a substep of said transmitting step.

9. A method according to claim 7 wherein as a substep of said transmitting step, said control program opens a single half-duplex pipe to said communications program.

10. A method according to claim 7 wherein as a substep of said transmitting step, said control program opens two half-duplex pipes to said communications program which operate in parallel as one full duplex pipe.

11. A method according to claim 10 wherein subsequent to said notifying step, said control program initiates an asynchronous read operation on one of said two half-duplex pipes which does not stop the execution of said client program; and wherein said control program informs said client program, via a callback, when data is actually available, in said one half-duplex pipe, to be read.

* * * * *